(No Model.)
R. D. MERSHON.
SYSTEM OF MULTIPHASE DISTRIBUTION.
No. 556,359. Patented Mar. 17, 1896.
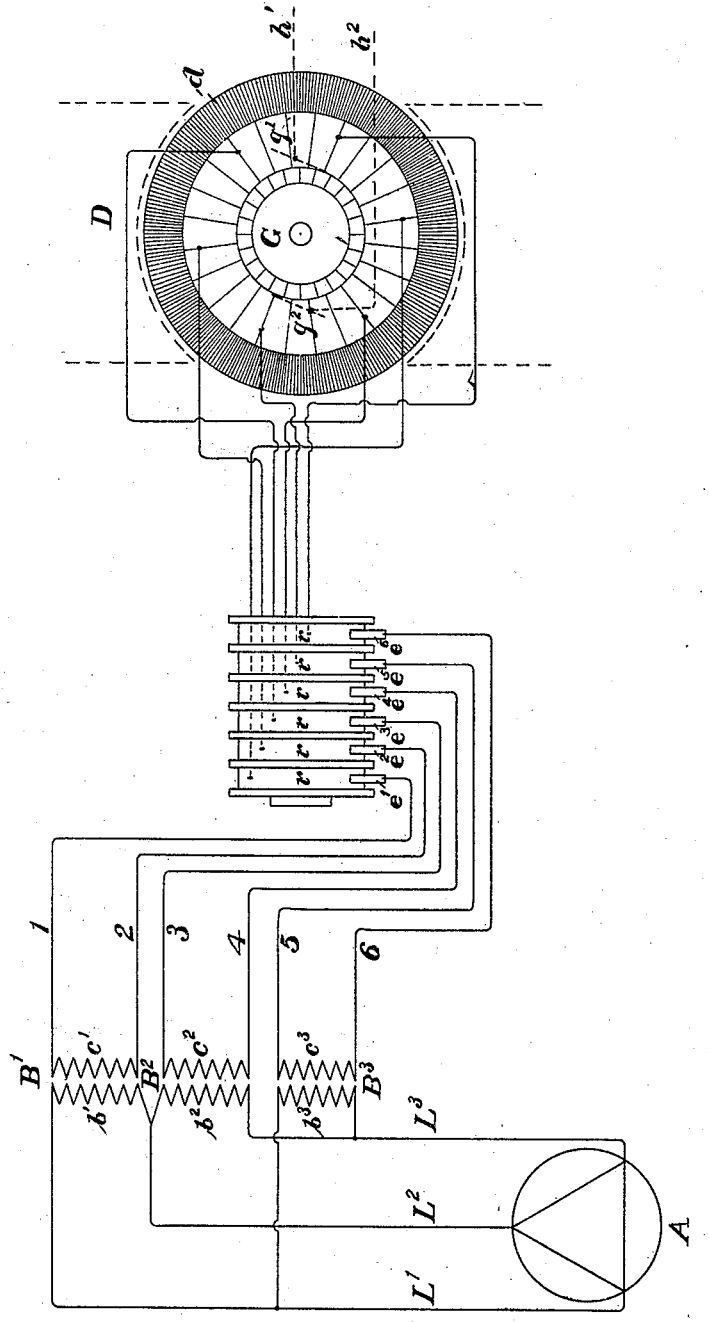
WITNESSES:
INVENTOR
Ralph D. Mershon
BY
Terry, MacKaye & Carr
ATTORNEYS.

UNITED STATES PATENT OFFICE.

RALPH D. MERSHON, OF PITTSBURG, PENNSYLVANIA.

SYSTEM OF MULTIPHASE DISTRIBUTION.

SPECIFICATION forming part of Letters Patent No. 556,359, dated March 17, 1896.

Application filed April 11, 1895. Serial No. 545,280. (No model.)

*To all whom it may concern:*

Be it known that I, RALPH D. MERSHON, a citizen of the United States, residing in Pittsburg, in the county of Allegheny and State of Pennsylvania, have invented a new and useful Improvement in Systems of Multiphase Alternating-Current Distribution, (Case No. 636,) of which the following is a specification.

My invention relates to the class of electrical distribution systems employing multiphase alternating currents and in which it is desired to transform such currents into continuous electric currents or into other alternating currents of a different number of phases.

The invention, while applicable to a various number of phases, is particularly useful in connection with three-phase distribution.

In the transmission of multiphase alternating currents it is customary to employ as few conductors as possible for conveying the currents and to connect these conductors to an equal number of points in the winding of the rotary converter.

I have found that by transforming the alternating current thus transmitted into a larger number of phases and correspondingly increasing the number of leads to the rotary-transformer winding the loss in the rotary transformer is decreased, or, in other words, the capacity of a given transformer is increased. For example, if a three-phase current is transmitted over three conductors it may be transformed by means of three converters, the secondary terminals of which, instead of being interconnected, are independently connected with six electrically-equidistant points of the winding of the rotary transformer. The output of the rotary transformer system so organized will be approximately forty or forty-five per cent. greater than if the three main-line conductors were directly connected with three points in the rotary transformer.

The accompanying drawing illustrates in diagram an organization of apparatus embodying the principles of the invention.

Referring to the figure, A represents a source of three-phase alternating electric currents, and $L'$ $L^2$ $L^3$ three main-line conductors leading therefrom. At or near the point where it is desired to transform the multiphase currents into continuous currents there are placed three transformers $B'$ $B^2$ $B^3$, the primaries $b'$ $b^2$ $b^3$ of which are connected with the main lines $L'$ $L^2 L^3$ in the usual manner. The secondary coils $c'$ $c^2$ $c^3$ of the transformers are connected with conductors 1, 2, 3, 4, 5 and 6, and these conductors are connected with contact-brushes $e'$ $e^2$ $e^3$ $e^4$ $e^5$ $e^6$, and through these contact-brushes to the single closed armature-winding $d$ of a rotary transformer D. The field-magnet of the rotary transformer, the pole-pieces of which are indicated by dotted lines, may be of any well-known construction suitable for this class of machines. The six contact-rings $r$, corresponding to the respective contact-brushes $e'$ $e^2 e^3 e^4 e^5 e^6$, are connected with equidistant points in the winding of the rotary transformer. The commutator G of the rotary transformer is supplied with brushes $g'$ $g^2$, through which continuous currents are delivered to the conductors $h'$ $h^2$, and the continuous current thus derived may be employed for any desired purpose.

As a general statement it may be added that the increase of output is due to the fact that at the instant any one of the alternating-current leads coincides with one of the direct-current brushes the current borne by this alternating-current lead is feeding directly into the direct-current brush without passing through the armature-winding of the rotary transformer. Consequently the greater the number of alternating-current circuits feeding the armature of the rotary transformer the greater will be the amount of this direct feeding and the less will be the loss in the armature of the rotary transformer due to its being traversed by the alternating currents. This statement may be mathematically demonstrated by complicated equations, but the foregoing general statement is sufficiently complete and accurate for the purposes of this specification.

I claim as my invention—

1. The combination with a multiphase system of distribution having a given number of main conductors, of electric converters having their primary terminals connected with the main-line circuits and a greater number of terminals derived from their secondary circuits than the number of main conductors, a rotary transformer having a single armature-winding, and connections from the respective secondary terminals with corresponding points of the armature-winding of the rotary transformer.

2. The combination with a three-wire three-phase alternating-current system of distribution, of three transformers having their primaries connected with the respective main-line conductors, six secondary terminals derived from the secondary coils of the said transformers, a rotary transformer having a single closed armature-winding and conductors leading from the respective secondary terminals to corresponding points of the armature-winding of the rotary transformer.

3. The combination with a three-wire three-phase alternating-current system of distribution, of three transformers having their primaries connected with the respective main-line conductors, a greater number of secondary terminals derived from the secondary coils of the said transformers, a rotary transformer having a single armature-winding, conductors leading from the respective secondary terminals to corresponding points of the armature-winding of the rotary transformer, a commutator having its segments connected with the winding of said transformer and brushes therefor delivering continuous currents from said rotary transformer.

In testimony whereof I have hereunto subscribed my name this 4th day of April, A. D. 1895.

RALPH D. MERSHON.

Witnesses:
WESLEY G. CARR,
H. C. TENER.